United States Patent
Agarwal et al.

(10) Patent No.: US 10,542,097 B2
(45) Date of Patent: Jan. 21, 2020

(54) INTEGRATING APPLICATIONS WITH ENDPOINTS USING DYNAMIC PORT NEGOTIATION

(71) Applicant: International Business Machines Corporation, Armonk, NY (US)

(72) Inventors: Matu Agarwal, Bangalore (IN); Subramanian Krishnan, Mysore (IN); Nagarjuna Surabathina, Andhra Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 15/365,747

(22) Filed: Nov. 30, 2016

(65) Prior Publication Data

US 2018/0152519 A1    May 31, 2018

(51) Int. Cl.
*H04L 29/08* (2006.01)
*H04L 29/06* (2006.01)

(52) U.S. Cl.
CPC ......... *H04L 67/141* (2013.01); *H04L 63/02* (2013.01); *H04L 67/10* (2013.01); *H04L 67/42* (2013.01); *H04L 63/029* (2013.01); *H04L 63/0272* (2013.01)

(58) Field of Classification Search
CPC ... H04L 63/02; H04L 63/0272; H04L 63/029; H04L 67/141; H04L 67/10; H04L 67/42; H04L 12/4641
See application file for complete search history.

(56) References Cited

U.S. PATENT DOCUMENTS

| | | | | |
|---|---|---|---|---|
| 6,820,115 | B1* | 11/2004 | Holt | H04L 12/2856 709/218 |
| 2008/0267178 | A1* | 10/2008 | Emmerich | H04L 41/00 370/389 |
| 2010/0088396 | A1* | 4/2010 | Armerding | H04L 63/029 709/218 |
| 2011/0083174 | A1 | 4/2011 | Aldridge et al. | |
| 2011/0280150 | A1 | 11/2011 | Turk | |
| 2014/0244851 | A1 | 8/2014 | Lee | |
| 2014/0344894 | A1* | 11/2014 | Moroney | H04L 63/10 726/4 |
| 2014/0358972 | A1* | 12/2014 | Guarrieri | G06F 21/6227 707/781 |

(Continued)

FOREIGN PATENT DOCUMENTS

WO    WO-2018004057 A1 *    1/2018    ............. H04L 29/08

*Primary Examiner* — Chris Parry
*Assistant Examiner* — Abderrahmen Chouat
(74) *Attorney, Agent, or Firm* — Patterson + Sheridan, LLP

(57) ABSTRACT

Systems, methods, and computer program products to perform an operation comprising obtaining a set of ports based on monitoring repeated attempts by a client application to establish a connection on ports signaled by a server application, establishing one or more secure connections between a client computer executing the client application to the server computer executing the server application based on the set of ports, opening each port of the set of ports to receive requests from the client application, listening on each of the set of ports for a first request from the client application to the server application, receiving, from the client application, the first request on a first port of the set of ports, and transmitting the first request to the server application.

17 Claims, 9 Drawing Sheets

(56) References Cited

U.S. PATENT DOCUMENTS

| | | | | |
|---|---|---|---|---|
| 2014/0372510 A1* | 12/2014 | Fausak | .................... | H04L 67/40 |
| | | | | 709/203 |
| 2015/0288709 A1* | 10/2015 | Singhal | ................ | H04L 63/102 |
| | | | | 726/23 |
| 2015/0295890 A1* | 10/2015 | Qin | ........................ | H04L 63/02 |
| | | | | 726/11 |
| 2016/0057008 A1* | 2/2016 | Liu | .................... | H04L 41/0816 |
| | | | | 709/217 |
| 2016/0127316 A1* | 5/2016 | Moskow | ............... | H04L 63/029 |
| | | | | 726/12 |
| 2018/0124198 A1* | 5/2018 | Petrov | ................ | H04L 67/2814 |

* cited by examiner

400A

```
[
    {
        "host": "9.184.117.236",
        "port": "9000"
    },
    {
        "host": "9.184.117.236",
        "port": "9003"
    },
    {
        "host": "9.184.117.236",
        "port": "9005"
    },
    {
        "host": "9.184.117.236",
        "port": "9004"
    },
    {
        "host": "9.184.117.236",
        "port": "9001"
    },
    {
        "host": "9.184.117.236",
        "port": "9002"
    }
]
```

```
[
    {
        "src": {
            "host": "9.184.117.236",
            "port": 9000
        },
        "dst": {
            "host": "destinationhostname.integration.somecloud.com",
            "port": 15051
        }
    },
    {
        "src": {
            "host": "9.184.117.236",
            "port": 9001
        },
        "dst": {
            "host": "destinationhostname.integration.somecloud.com",
            "port": 15052
        }
    },
    {
        "src": {
            "host": "9.184.117.236",
            "port": 9002
        },
        "dst": {
            "host": "destinationhostname.integration.somecloud.com",
            "port": 15053
        }
    },
    .
    .
    .
]
```

FIGURE 4B

INTEGRATING APPLICATIONS WITH ENDPOINTS USING DYNAMIC PORT NEGOTIATION

BACKGROUND

The present disclosure relates to cloud computing, and more specifically, to integrating applications with endpoints using dynamic port negotiation.

In cloud computing environments, users typically host their workload or applications entirely on third-party cloud services and servers. Hybrid cloud environments built upon cloud computing technologies and concepts to address security and flexibility concerns over relying entirely on third party systems for mission critical or sensitive applications. Hybrid cloud environments combine a public cloud provider with a private cloud platform. Private clouds may be independent of the public cloud and may be set up and hosted by a single organization using technologies similar to those utilized by public cloud providers. Hybrid cloud enables and organization to better control and secure their data in their own private cloud, while still being able to leverage computation resources and scale of the public cloud, for example, executing existing applications in the public cloud using data hosted in a private cloud.

Integrating existing applications into cloud environments presents challenges as these existing applications are often designed for an intranet environment. For example, a first portion of a business application, such as a client portion, running on a first computer in a private cloud. The private cloud may be connected to a public cloud via, for example, a SSH tunnel. The first computer may attempt to establish a connection to a second portion of the business application, such as a back-end server, running on a second computer in the public cloud using a known port. The second computer may then determine a second port for further responses and transmit this second port information to the first computer. The first computer may then attempt to establish a connection on this second port. However, the SSH tunnel is unaware of this second port and is unable to setup and open the respective port for further communications.

SUMMARY

According to one embodiment of the present disclosure, a method for establishing communications using a dynamically negotiated port by an adapter application. The method comprises obtaining a set of ports based on monitoring repeated attempts by a client application to establish a connection on ports signaled by a server application, establishing one or more secure connections between a client computer executing the client application to the server computer executing the server application based on the set of ports, opening each port of the set of ports to receive requests from the client application, listening on each of the set of ports for a first request from the client application to the server application, receiving, from the client application, the first request on a first one of the set of ports, and transmitting the first request to the server application.

According to another embodiment of the present disclosure, a system comprises a processor and a memory including a program which when executed by the processor, performs an operation. The operation comprises obtaining a set of ports based on monitoring repeated attempts by a client application to establish a connection on ports signaled by a server application, establishing one or more secure connections between a client computer executing the client application to the server computer executing the server application based on the set of ports, opening each port of the set of ports to receive requests from the client application, listening on each port of the set of ports for a first request from the client application to the server application, receiving, from the client application, the first request on a first one of the set of ports, and transmitting the first request to the server application.

According to another embodiment of the present disclosure, a computer program product comprises a computer-readable storage medium having computer-readable program code embodied therewith, the computer-readable program code executable by one or more computer processors to perform an operation. The operation comprises obtaining a set of ports based on monitoring repeated attempts by a client application to establish a connection on ports signaled by a server application, establishing one or more secure connections between a client computer executing the client application to the server computer executing the server application based on the set of ports, opening each port of the set of ports to receive requests from the client application, listening on each port of the set of ports for a first request from the client application to the server application, receiving, from the client application, the first request on a first one of the set of ports, and transmitting the first request to the server application.

BRIEF DESCRIPTION OF THE SEVERAL VIEWS OF THE DRAWINGS

FIG. 4A is an example configuration file, in accordance with aspects of the present disclosure.

FIG. 4B is an example setup file, in accordance with aspects of the present disclosure.

DETAILED DESCRIPTION

Embodiments disclosed herein help integrate existing applications into a cloud computing environment using endpoints with dynamic port negotiation. Specifically, in a hybrid cloud environment, applications may execute on a public cloud based platform and these applications may need to securely connect to endpoints hosted by enterprises. For example, an organization may use a hybrid cloud architecture using components of both a private and public cloud. For example, the organization could execute an application on a public cloud infrastructure (i.e., a cloud environment hosted by a third party), but store data on the organization's private cloud. Executing existing applications in a hybrid cloud allows an organization to leverage the scalability and flexibility offered by public cloud offerings, for example such as bursting applications to the public cloud on demand, transparently to users, while still retaining control of the application and user data.

Applications running in the public cloud may require secure connectivity to an organization through secure endpoints within the organization. For example, this connectivity may be achieved using virtual private networks (VPN), secure shell (SSH) tunnels, direct physical links, or other similar mechanisms. Generally, when secure tunnels are used, the port number associated with the secure tunnel is known when communications between endpoints are established. For example, certain applications always use a single or set of static ports for communications. Establishing secure tunnels for these types of applications is generally straightforward.

Advantageously, embodiments described herein provide techniques for integrating cloud computing environments with endpoints using dynamic port negotiation. For example organizations often rely on compiled, closed, and possibly legacy, third party applications in an intranet environment. Often these applications do not natively support secure tunnels for a hybrid cloud environment and due to their closed source, compiled state, cannot be easily modified to include such support. What is needed is a technique for dynamic port negotiations for such applications.

Figure 1A:
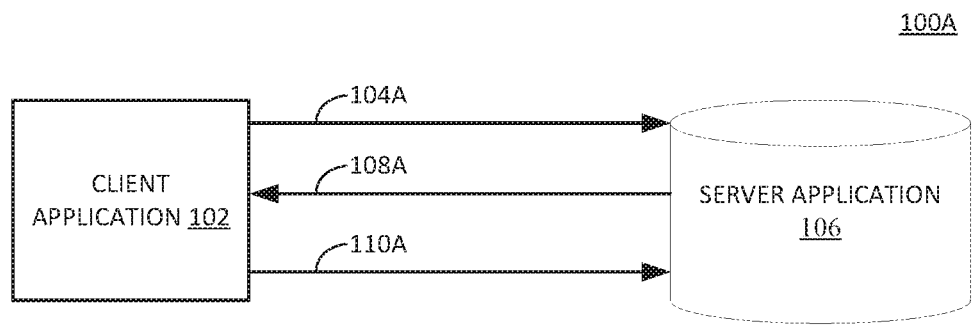
FIG. 1A is a diagram illustrating techniques for establishing communications, according to aspects of the present disclosure.

FIG. 1A is a diagram 100A illustrating techniques for establishing communications links, according to aspects of the present disclosure. As shown in FIG. 1A, certain client applications 102 executing in, for example, an intranet environment may utilize a static port for initial contact by transmitting a connection message 104A to a server application 106 executing on an enterprise server or other compute node using, for example, a proprietary protocol. The server application 106 may dynamically determine a port or set of ports for use by the client application 102 and transmit this port information 108A back to the client application 102. The client application 102 then uses this port information for further communications 110A. As the ports for further communications are dynamically determined and not known prior to initial contact 104, it may be difficult to establish secure tunnels for these applications when such applications are integrated into a hybrid cloud environment. Additionally, as the client application 102 and server application 106 may communicate using a proprietary protocol, it may be difficult to determine which ports to open.

Figure 1B:
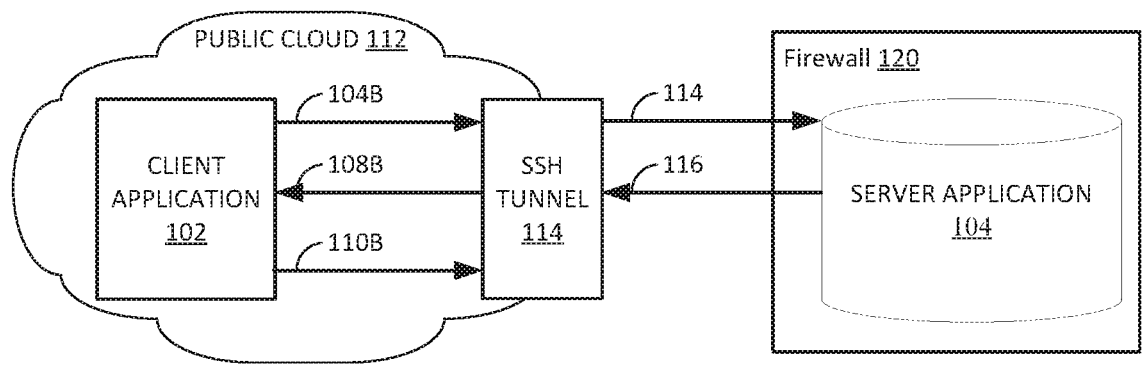
FIG. 1B is a diagram illustrating unsuccessful port negotiations, according to aspects of the present disclosure.

For example, as showing in FIG. 1B, a SSH tunnel 114 is established between the client application 102 executing in the public cloud 112 and the server application 104 executing on, for example a private cloud or an intranet of an organization. The SSH tunnel 114 provides a secure connection through which other traffic may be passed through. The SSH tunnel 114 operates on a local port, corresponding to the known initial port of the application 102 and the SSH tunnel 114 may be dynamically created by a SSH client as needed. The client application 102 transmits a connection message 104B via the SSH tunnel 114. The SSH tunnel 114, aware of the static port utilized by the client application 102, receives the connection message 104B and forwards the message 114 to the server application 104, past firewall 120. The server application 104 determines a port or set of ports for use by the application 102 and transmits this port information message 116 via the SSH tunnel 114. The SSH tunnel 114 forwards the port information message 108B to the client application 102. However, as the port information message 108B utilizes a proprietary protocol and is dynamically assigned, the SSH tunnel 114 does not know the port determined by the server application 104 and is unable to setup and open the respective port for further communications 110B.

As used herein, an "application" may refer to any executable program code, such as a job, workload, service, task, script, and the like, and may be of any suitable format, such as a binary file, executable, installer package, image, and the like.

Figure 2:
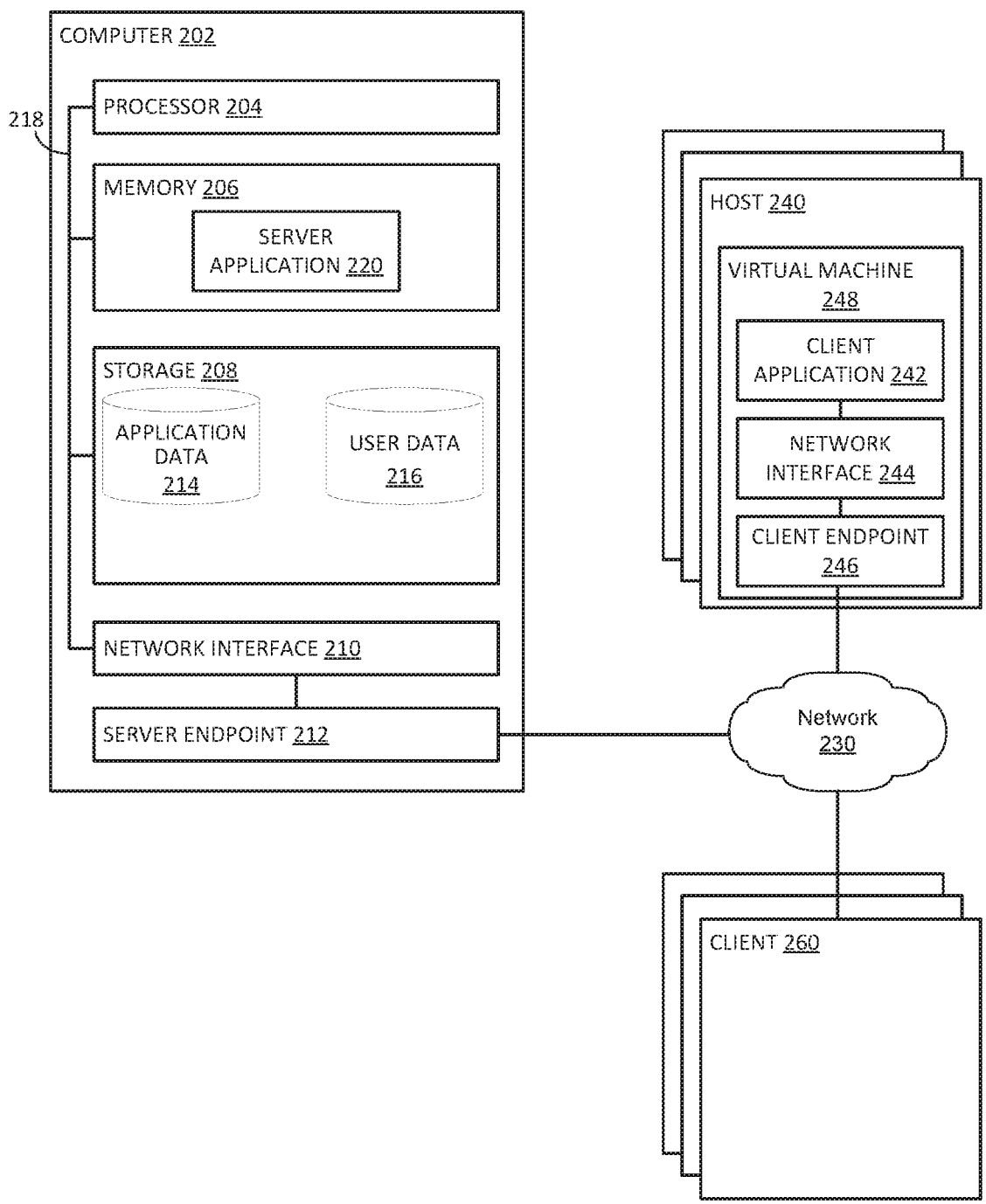
FIG. 2 illustrates a cloud computing environment configured to provide automatic, analysis-based scheduling of jobs to appropriate cloud resources, according to one embodiment.

FIG. 2 illustrates a cloud computing environment 200 configured to enable applications executing in cloud computing environments to integrate applications with endpoints using dynamic port negotiation, according to one embodiment. The cloud computing environment 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 which obtains instructions and data via a bus 218 from a memory 206 and/or a storage 208. The computer 202 may also include one or more network interface devices 210 connected to the bus 218. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is a programmable logic device that performs instruction, logic, and mathematical processing, and may be representative of one or more CPUs. The processor may execute a server application 242 in memory 206. The network interface device 210 may be any type of network communications device allowing the computer 202 to communicate with other computers via the network 230. The network interface 210 may exchange messages with the network 230 via a server endpoint 212. The server endpoint 212 may be a software or hardware system, such as firewall, VPN, SSH tunnel, or secure gateway service, designed to prevent unauthorized access to a computer or private network and may screen traffic based on specified security criteria. Generally, all messages entering or leaving a private network or computer passes through the server endpoint 212.

The storage 208 is representative of hard-disk drives, solid state drives, flash memory devices, optical media, and the like. Generally, the storage 208 stores application data 214 and user data 216 for use by the computer 202. In addition, the memory 206 and the storage 208 may be considered to include memory physically located elsewhere; for example, on another computer coupled to the computer 202 via the bus 118. The application data 214 may include executable files for the application, attributes of the applications, versions of the applications, and the like. The user data 216 may also include user preferences and application data associated with specific users.

According to aspects of the present disclosure, the computer 202 may be one or more servers operating as a part of a private cloud system within an organization. For example, computer 202 may operate as a backend or data repository server for one or more server applications 220.

The hosts 240 are compute nodes configured to execute one or more client applications 242. The hosts 240 may include a network interface 244 and a client endpoint 246 through which the client applications 242 may utilize for communications. The client applications 242 may be executed in the context of a virtual machine 248. Generally, a virtual machine is an emulation of a computer system and the network interface 244 and server endpoint 246 may also execute within the context of the virtual machine. Generally, client application 242 may be deployed in any suitable configuration. For example, client application 242 may execute on computer 202 as a process, or within the context of a virtual machine executing on computer 202. As shown, client application 242 executes on hosts 240, which are separate from computer 202. The hosts 240 may, for example, operate as a part of a public cloud coupled to network 230. While referred to as a client, the client application 242 may refer to a front end application or applications server.

One or more client 260 compute nodes may access the client application 242, for example through an internet browser or other application via the network 230. The client application 242 communicates with the computer 202 via the network 230 while interacting with server application 220. This communication may be conducted through proprietary protocols or secure (e.g., encrypted) formats and may pass through the server endpoint 212 and the client endpoint 246 such as a VPN, SSH tunnel, network address translation (NAT) routing, or secure gateway service.

According to aspects of the present disclosure, adapter applications for endpoints can be used to enable applications using dynamic port negotiation to run in a cloud computing environment. Where an existing application utilizes a fixed port for initiating a connection, followed by a dynamically assigned port for subsequent communications, an adapter application may be implemented to enable the existing application to operate in a cloud computing environment with secure tunnels. The adapter application may be implemented using three phases, including a detection phase, configuration phase and adaptation phase.

Figure 3:
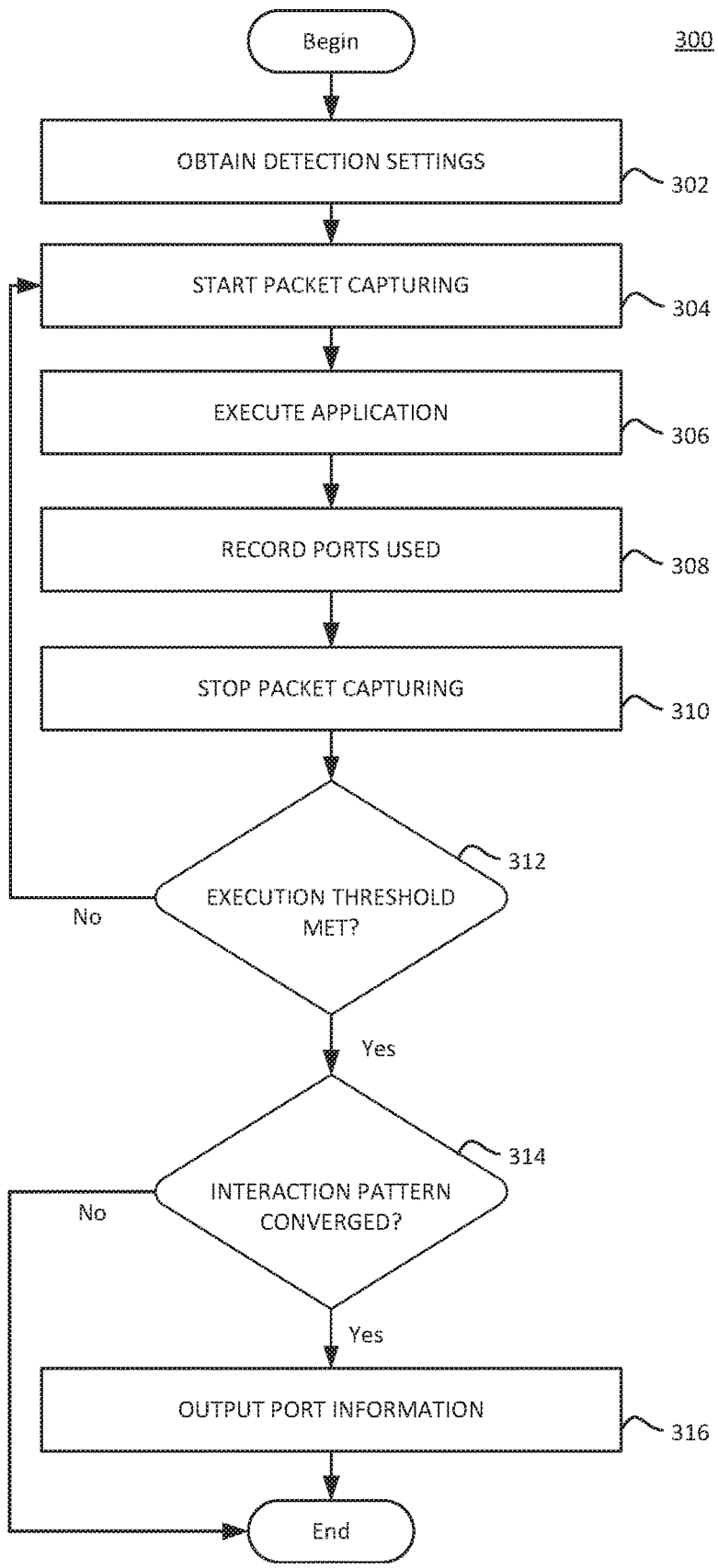
FIG. 3 is a flow chart illustrating a method to provide automatic, analysis-based scheduling of jobs to appropriate cloud resources, according to one embodiment.

FIG. 3 is a flow chart illustrating a technique 300 for detecting ports used by an application, according to aspects of the present disclosure. This detection phase may be executed on a computing environment sufficient to support the existing application, such as a local computer or a virtualized intranet environment. Alternatively, detection may be performed utilizing a pre-production or production server environment and a client computer configured with, for example, an application including a detection module and a network packet capturing tool along with the client application.

At 302, detection settings may be obtained. For example, detection settings may include information related to a period of time or numerical count of times to execute the application. Detection settings may also include various convergence criteria for determining whether the application has converged during execution. At 304 packet capturing is initiated. Packet capturing may be performed via, for example, a network packet capturing tool. The network packet capturing tool allows for recording, viewing, and analyzing network traffic. The network packet capturing tool captures, among other information, information related to the ports utilized by the client application and the server application. At 306, the client application is executed. The client application initiates communications with the server application via a known initial port and the server application responds with a dynamically determined port for further communications. This exchange is monitored by the network packet capturing tool and the ports utilized are recorded at 308. At 310, packet capturing is stopped and at 312, a determination is made as to whether an execution threshold is met. This execution threshold is based on the detection settings. If the execution threshold is met, at 314, an interaction pattern is checked to see whether the interaction pattern has converged. This check looks to two or more interactions between the client application and the server application to determine whether there are patterns in, for example, the ports utilized for further communications. These patterns may be converged, for example, when a set of ports are observed to be utilized repeatedly for further communications. Preferably, this set is repeatedly used multiple times. If such a set is not determined, for example if the client and server application utilize a fully randomized port each time or if the number of times to execute the client and server application is insufficient, then the interaction pattern does not converge and an error may be returned to the user. Where such a set is determined, this set is outputted at 316 and the detection phase ends.

FIG. 4A is an example configuration file 400A, in accordance with aspects of the present disclosure. Where the interaction pattern converges over a set of successive executions of a client and server applications, the detection phase outputs a file for the interaction pattern indicating, for example, the ports utilized by the client and server applications. This output file may be normalized to include unique ports utilized without repeat entries. Here, ports 9000-9005 comprise the set of ports utilized.

After a set of ports are determined in the detection phase, the output configuration file may be utilized in the configuration phase to create a setup file for setting up tunnels for each of the hosts and ports specified in the setup file.

FIG. 4B is an example setup file 400B, in accordance with aspects of the present disclosure. In creating the setup file, the configuration file may be modified to include various mappings, commands, URLs, or other information to programmatically setup and configure a secure endpoint for each unique host and port specified in the configuration file with, for example, an SSH tunneling client, secure gateway service, or other secure endpoint. In setup file 400B, source and destination tags may be included, along with fully qualified domain names of the host, along with information related to port mappings.

The adaptation phase sets up one or more port mappings to allow for seamless interactions between the client and server applications. This adaptation works in conjunction with the secure endpoints. For example, where the client application utilizes SSH tunnels for connectivity with the server application, the adapter application or module may set up SSH tunnels between the client and server corresponding to each unique host and port specified in the setup file. In another example, where the client application utilizes a firewall with NAT routing rules, the adapter application or module may setup NAT destination pre-routing rules to forward packets through the firewall.

Figure 5:
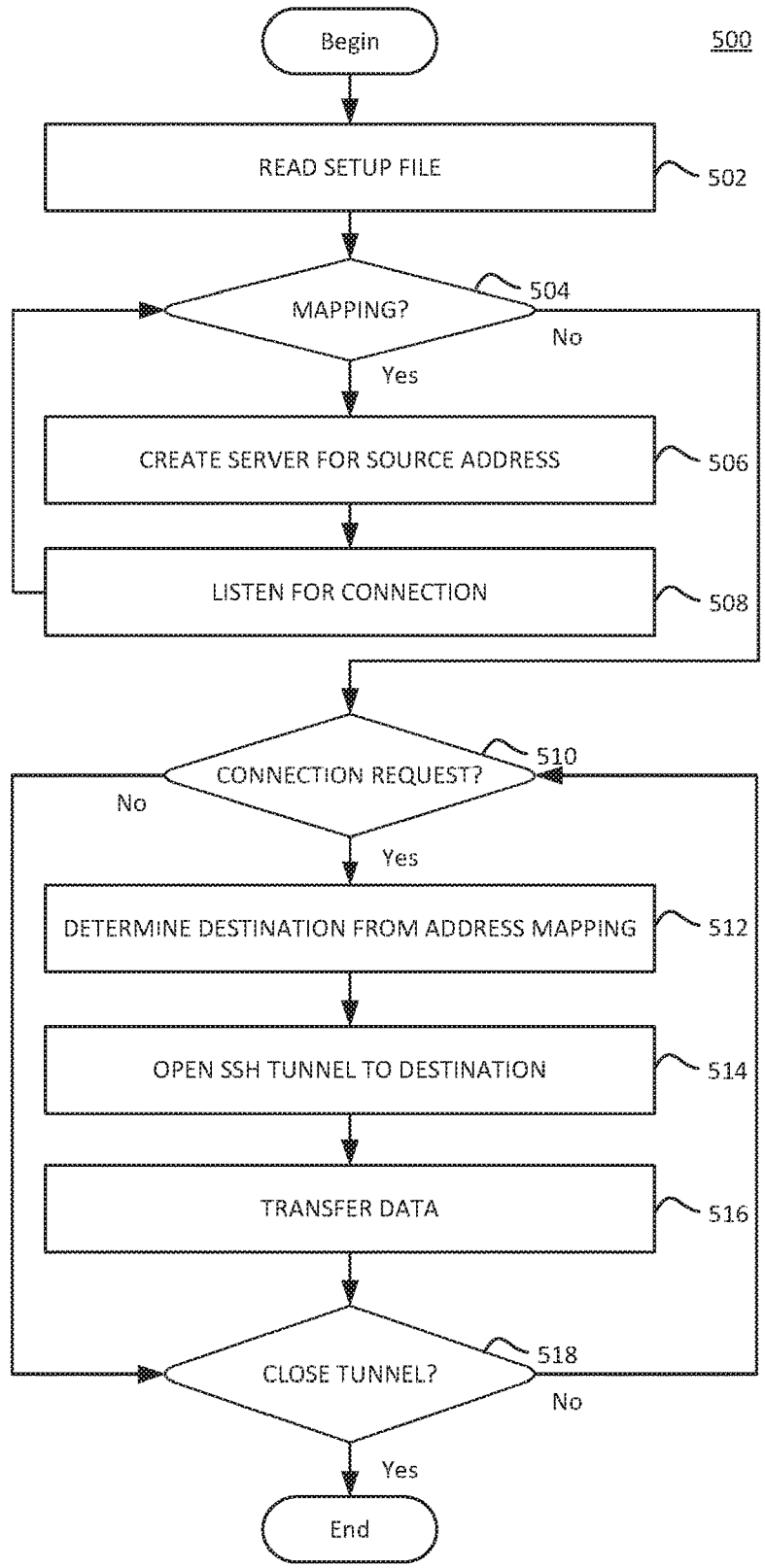
FIG. 5 is a flow chart a technique for adapting ports for an application by a secure gateway service, according to aspects of the present disclosure.

FIG. 5 is a flow chart illustrating a technique 500 for adapting ports for an application by a secure gateway service, according to aspects of the present disclosure.

According to certain aspects, the adapter application or module may operate in conjunction with, or as a part of, a secure gateway service. The secure gateway may setup a local server on the client or server computer mapped to specific hosts and ports and traffic directed at these mapped hosts and ports by the client application are routed through the secure gateway service. The secure gateway service establishes a connection between the secure gateway services serving the client and server. This connection may be on a port separate from ports used by the client or server applications. The adapter application may direct the secure gateway to establish secure connection with the server computer based on the ports indicated in the setup file. At 502, the setup file created during the configuration phase is read by the adapter and at 504, stepping through each host and port to be mapped. Where there are host/port to be mapped, at 506, a local server is created for the host/port and the adapter may open a local port corresponding to the host/port. For example, the adapter may parse setup file 400B and create a local server for host 9.184.117.236 on port 9000 for the first host/port entry and 9.184.117.236 on port 9001 for the second host/port entry, and so forth for each host/port entry in the setup file 400B. At 508, the adapter listens for connections from the client application on the local machine. Communications from applications executing on the local machine directed at the specific host/port may be routed to the adapter and through the secure gateway. When a connection request is detected at 510, a determination may be made as to the destination address based on the local address mapping. For example, with reference to the setup file 400B of FIG. 4B, the client application may send an initial request to host 9.184.117.236, port 9000. The adapter receives the request and determines that the request is to be forwarded to destination host, here, destinationhostname.integration.somecloud.com on port 15051. The adapter directs the secure gateway, at 514, to open a SSH tunnel to the destination address and port and at 516, the initial request is transferred to the destination and on to the server application.

The server application may then determine a dynamic port, for example 9001, for use by the client application and transmit this information through the established SSH tunnel to the client application for use for further communications. In response, the client application then sends a request directed to the same host on port 9001. The adapter, listening on port 9001, receives this request and forwards this request to the destination in a manner similar to the initial request.

Figure 6:
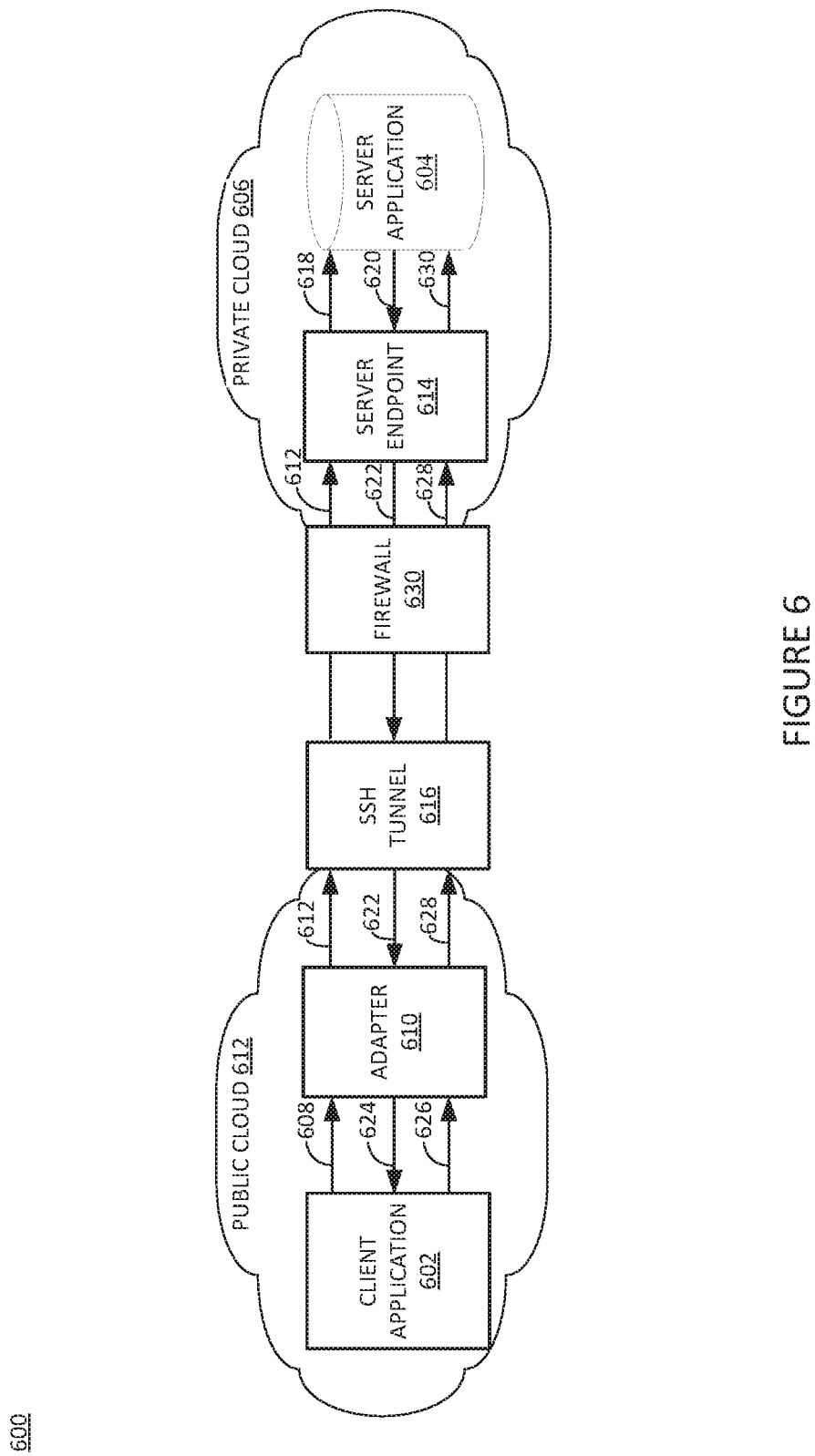
FIG. 6 is a diagram illustrating techniques for dynamically establishing communications links, according to aspects of the present disclosure

FIG. 6 is a diagram 600 illustrating techniques for dynamically establishing communications links, according to aspects of the present disclosure. As shown, client application 602 executes in the public cloud 612 and the server application 604 executes on, for example on a private cloud 606. The client application 602, with reference to the setup file 400B of FIG. 4B, transmits an initial connection message 608 on port 9000. The adapter 610, receives the initial connection message and forwards 612 the message to server endpoint 614 at destination host, here destinationhostname.integration.somecloud.com on port 15051, via the SSH tunnel 616. The server endpoint 614 then forwards 618 the initial connection message to the server application 604 on port 9000. The adapter 610, SSH tunnel 616, and server endpoint 614, for example, may be components of a secure gateway service. The server application 604 then determines a dynamic port, for example 9001, and transmits 620 this information to the server endpoint 614 on port 9000. The server endpoint 614 forwards 622 this information, on port 15051, through the SSH tunnel 616 to the adapter 610, which then forwards 624 the information to the client application 602 on port 9000. In response to the information, the client application 602 sends a second message 626 to the server application 604 on port 9001, which the adapter 610 is listening on. The adapter 610 forwards 628 the second message to server endpoint 614 at destination host, here destinationhostname.integration.somecloud.com on port 15052, via the SSH tunnel 616. The server endpoint 614 then forwards 618 the second message to the server application 604 on port 9001, establishing the communications link on the dynamically assigned port.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
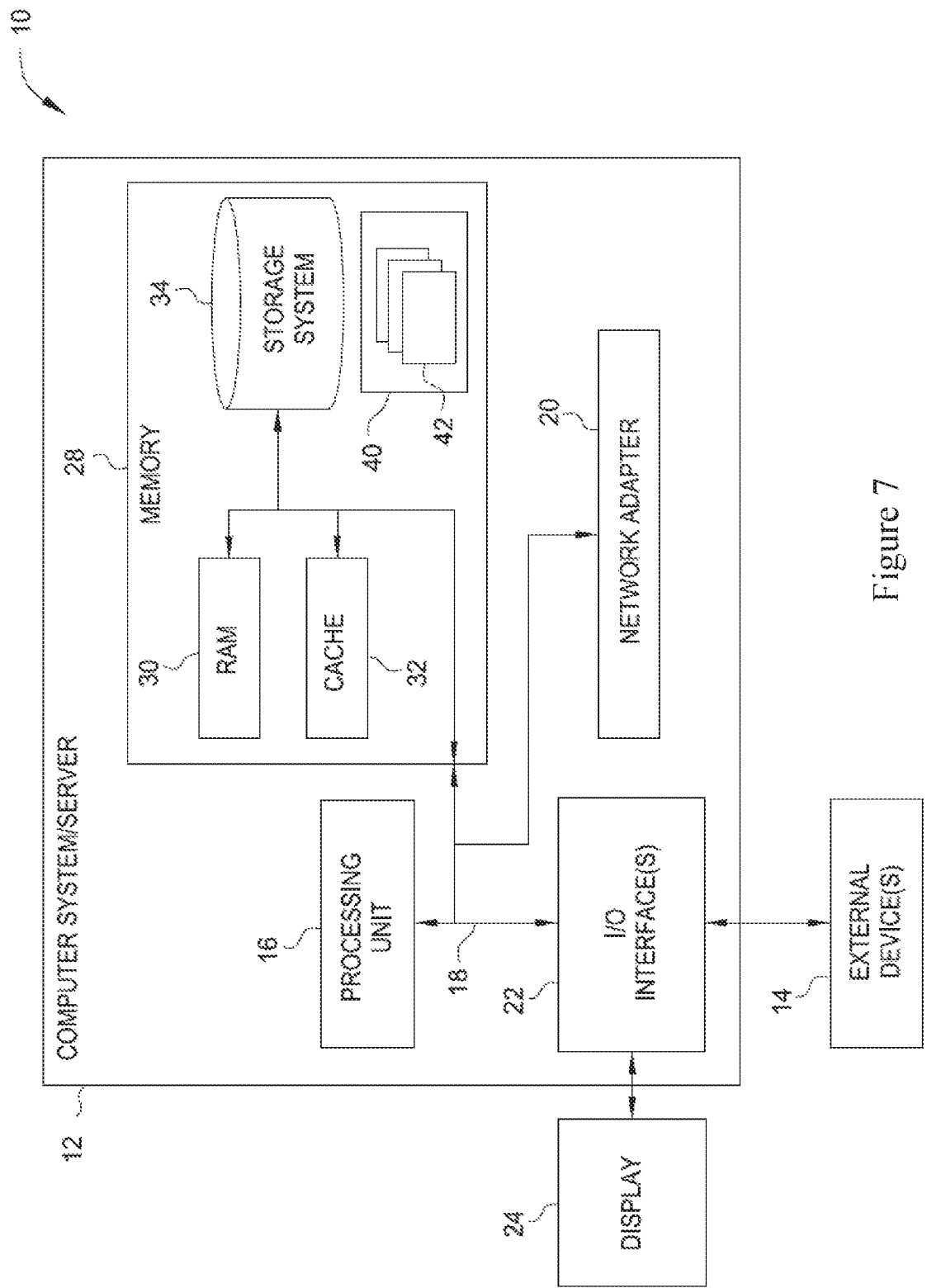
FIG. 7 illustrates a cloud computing node according to one embodiment.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
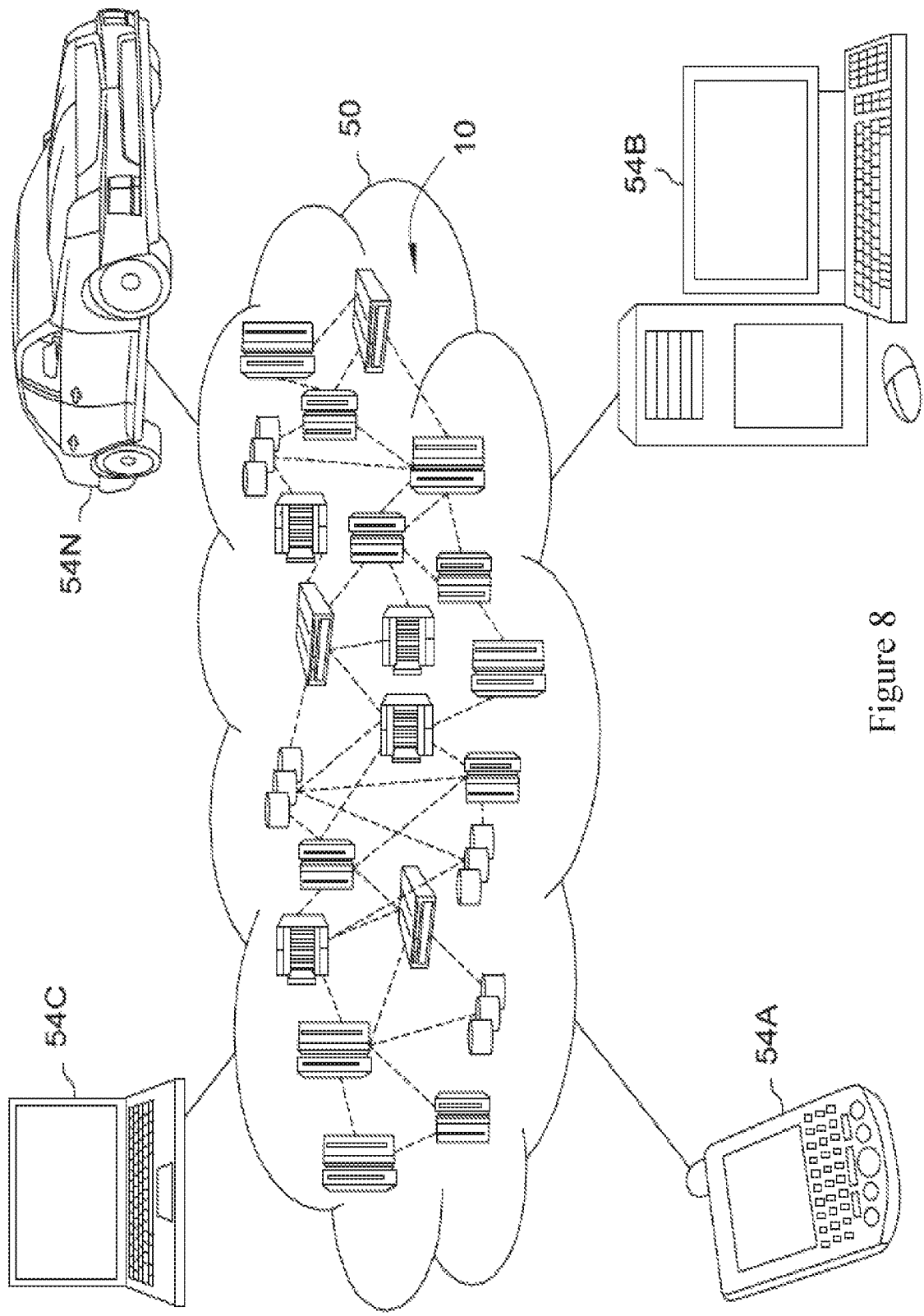
FIG. 8 illustrates a cloud computing environment according to one embodiment.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
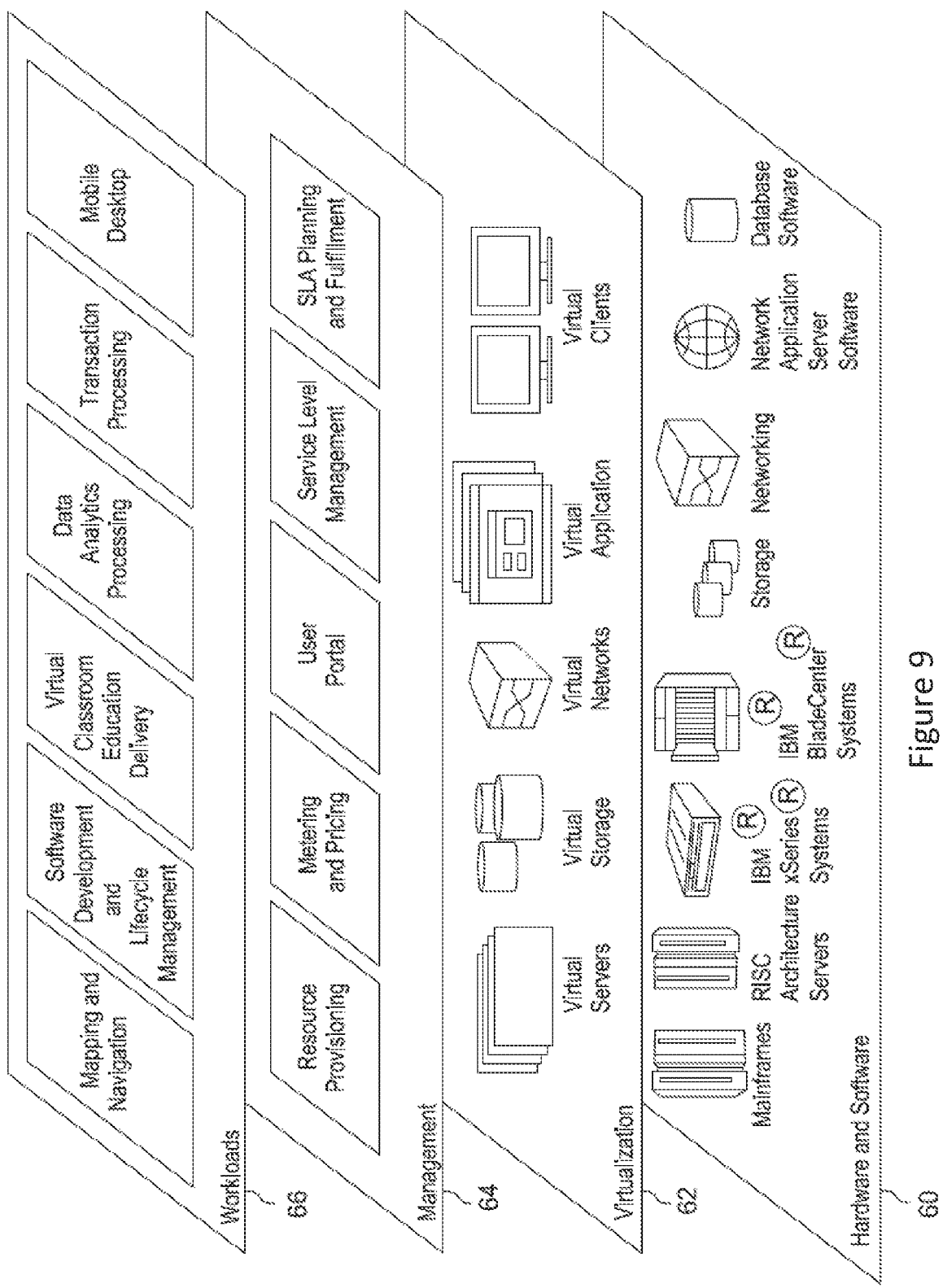
FIG. 9 illustrates abstraction model layers according to one embodiment.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. The resource provisioning may be based on an analysis of the requested job/application and the cloud computing environment itself, as described above. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:

triggering, by an adapter application, a plurality of attempts by a client application to establish a connection to a server application, wherein the adapter application and the client application are both located in a first cloud, wherein each of the plurality of attempts is directed to a predefined static port of a server computer that is located in a second cloud, and wherein the server computer is hosting the server application;

determining, by the adapter application, based on the plurality of attempts, a set of dynamic remote ports, wherein determining the set of dynamic remote ports comprises:

for each respective attempt of the plurality of attempts:

receiving a respective response from the server application, wherein the respective response specifies a respective dynamic port that the client application should use for communications, wherein the respective dynamic port is different than the predefined static port; and monitoring attempts by the client application to establish a connection to the server application via the respective dynamic port, wherein the determined set of dynamic remote ports includes the predefined static port and one or more dynamic ports that have been used a predefined number of times, and wherein the one or more dynamic ports that have been used a predefined number of times includes a second remote port;

opening, by the adapter application, a plurality of local ports based on the determined set of dynamic remote ports, wherein the plurality of local ports is located in the first cloud and receives requests from the client application;

listening, on each respective port of the plurality of local ports, for requests from the client application to the server application; and upon receiving, from the client application, a first request on a first local port of the plurality of local ports:

establishing a first secure connection to the second remote port in the set of dynamic remote ports, wherein the second remote port corresponds to the first local port; and transmitting the first request to the server application via the first secure connection.

2. The method of claim 1, wherein the server application is configured to:

receive an initial request for communication from the client application via the predefined static port;

determine a dynamic port for subsequent communications with the client application; and transmit an indication of the determined dynamic port to the client application.

3. The method of claim 1, further comprising:

upon receiving, from the client application, a second request on a second local port of the plurality of local ports:

establishing a second secure connection to a third remote port in the set of dynamic remote ports, wherein the third remote port corresponds to the second local port; and transmitting the second request to the server application via the second secure connection.

4. The method of claim 1, the method further comprising:

outputting a normalized configuration file indicating the set of dynamic remote ports, wherein opening the plurality of local ports is based on the outputted normalized configuration file.

5. The method of claim 1, wherein opening the plurality of local ports comprises:

establishing a respective local server for each port of the set of dynamic remote ports.

6. The method of claim 1, wherein opening the plurality of local ports comprises:

establishing client endpoint mappings for each port of the set of dynamic remote ports.

7. A system comprising:

one or more computer processors;

a memory containing a program which when executed by the one or more computer processors performs an operation, the operation comprising:

triggering, by an adapter application, a plurality of attempts by a client application to establish a connection to a server application, wherein the adapter application and the client application are both located in a first cloud, wherein each of the plurality of attempts is directed to a predefined static port of a server computer that is located in a second cloud, and wherein the server computer is hosting the server application;

determining, by the adapter application, based on the plurality of attempts, a set of dynamic remote ports, wherein determining the set of dynamic remote ports comprises:

for each respective attempt of the plurality of attempts:

receiving a respective response from the server application, wherein the respective response specifies a respective dynamic port that the client application should use for communications, wherein the respective dynamic port is different than the predefined static port; and monitoring attempts by the client application to establish a connection to the server application via the respective dynamic port, wherein the determined set of dynamic remote ports includes the predefined static port and one or more dynamic ports that have been used a predefined number of times, and wherein the one or more dynamic ports that have been used a predefined number of times includes a second remote port;

opening, by the adapter application, a plurality of local ports based on the determined set of dynamic remote ports, wherein the plurality of local ports is located in the first cloud and receives requests from the client application;

listening, on each respective port of the plurality of local ports, for requests from the client application to the server application; and upon receiving, from the client application, a first request on a first local port of the plurality of local ports:

establishing a first secure connection to the second remote port in the set of dynamic remote ports, wherein the second remote port corresponds to the first local port; and transmitting the first request to the server application via the first secure connection.

8. The system of claim 7, wherein the server application is configured to:

receive an initial request for communication from the client application via the predefined static port;

determine a dynamic port for subsequent communications with the client application; and transmit an indication of the determined dynamic port to the client application.

9. The system of claim 7, the operation further comprising:

upon receiving, from the client application, a second request on a second local port of the plurality of local ports:

establishing a second secure connection to a third remote port in the set of dynamic remote ports, wherein the third remote port corresponds to the second local port; and transmitting the second request to the server application via the second secure connection.

10. The system of claim 7, wherein the listening is based on an outputted normalized configuration file.

11. The system of claim 7, the operation further comprising:

outputting a normalized configuration file indicating the set of dynamic remote ports, wherein opening the plurality of local ports comprises:

establishing a respective local server for each port of the set of dynamic remote ports.

12. The system of claim 7, wherein opening the plurality of local ports comprises:

establishing client endpoint mappings for each port of the set of dynamic remote ports.

13. A computer program product comprising:

a computer readable storage medium having computer-readable program code embodied therewith, the computer-readable program code configured to perform an operation, the operation comprising:

monitoring, by an adapter application, a plurality of attempts by a client application to establish a connection to a server application, wherein the adapter application and the client application are both located in a first cloud, wherein each of the plurality of attempts is directed to a predefined static port of a server computer that is located in a second cloud, and wherein the server computer is hosting the server application;

determining, by the adapter application, based on the plurality of attempts, a set of dynamic remote ports, wherein determining the set of dynamic remote ports comprises:

for each respective attempt of the plurality of attempts:

receiving a respective response from the server application, wherein the respective response specifies a respective dynamic port that the client application should use for communications, wherein the respective dynamic port is different than the predefined static port; and monitoring attempts by the client application to establish a connection to the server application via the respective dynamic port, wherein the determined set of dynamic remote ports includes the predefined static port and one or more dynamic ports that have been used a predefined number of times, and wherein the one or more dynamic ports that have been used a predefined number of times includes a second remote port;

opening, by the adapter application, a plurality of local ports based on the determined set of dynamic remote ports, wherein the plurality of local ports is located in the first cloud and receives requests from the client application listening, on each respective port of the plurality of local ports, for requests from the client application to the server application; and upon receiving, from the client application, a first request on a first local port of the plurality of local ports:

establishing a first secure connection to a second remote port in the set of dynamic remote ports, wherein the second remote port corresponds to the first local port; and transmitting the first request to the server application via the first secure connection.

14. The computer program product of claim 13, wherein the server application is configured to:

receive an initial request for communication from the client application via the predefined static port;

determine a dynamic port for subsequent communications with the client application; and transmit an indication of the determined dynamic port to the client application.

15. The computer program product of claim 13, the operation further comprising:

upon receiving, from the client application, a second request on a second local port of the plurality of local ports:

establishing a second secure connection to a third remote port in the set of dynamic remote ports, wherein the third remote port corresponds to the second local port; and transmitting the second request to the server application via the second secure connection.

16. The computer program product of claim 13, the operation further comprising:

outputting a normalized configuration file indicating the set of dynamic remote ports, wherein opening the plurality of local ports is based on the outputted normalized configuration file.

17. The computer program product of claim 13, wherein opening the plurality of local ports comprises:

establishing a respective local server for each port of the set of dynamic remote ports.

* * * * *